(12) United States Patent
Parihar et al.

(10) Patent No.: US 8,489,464 B1
(45) Date of Patent: Jul. 16, 2013

(54) METHOD, MEDIUM, AND SYSTEM OF PRESENTING RESALE OPPORTUNITIES TO PURCHASERS OF RESALABLE ITEMS

(75) Inventors: Sunil Singh Parihar, Renton, WA (US); Joe Jony Jeyaratnam, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 140 days.

(21) Appl. No.: 13/236,936

(22) Filed: Sep. 20, 2011

(51) Int. Cl.
*G06Q 30/00* (2012.01)

(52) U.S. Cl.
USPC ........................................ 705/26.1

(58) Field of Classification Search
USPC .............................................. 705/26.1, 27.1
See application file for complete search history.

(56) References Cited

U.S. PATENT DOCUMENTS

| | | | |
|---|---|---|---|
| 2002/0143664 A1* | 10/2002 | Webb | 705/27 |
| 2007/0150588 A1* | 6/2007 | Ghadialy et al. | 709/224 |
| 2009/0254971 A1* | 10/2009 | Herz et al. | 726/1 |
| 2011/0270707 A1* | 11/2011 | Breed et al. | 705/26.63 |

OTHER PUBLICATIONS

Secret Reserve Prices in a Bidding Model with a Resale Option Ignatius J. Horstmann, The American Economic Review, vol. 87, No. 4 (Sep. 1997), pp. 663-669.*

* cited by examiner

*Primary Examiner* — Matthew Zimmerman
(74) *Attorney, Agent, or Firm* — Hope Baldauff, LLC

(57) ABSTRACT

Technologies are described herein for presenting resale opportunities to purchasers of resalable items. An identifier of a resalable item is received. A number of resale estimates are determined for the item and presented to the purchaser of the item, and the purchaser indicates whether or not he or she intends to resale the item at a future date. Upon receiving an indication that the purchaser intends to resale the item, a resale prospect is stored containing the identifier of the item, an identifier of the purchaser, the date for resale of the item, the resale estimates, and the like. The purchaser may then be presented with at least one reminder regarding the resale of the item on or near the date for resale. The reminder may further include the resale estimates and a facility allowing the purchaser to quickly and easily initiate resale of the item.

14 Claims, 6 Drawing Sheets

METHOD, MEDIUM, AND SYSTEM OF PRESENTING RESALE OPPORTUNITIES TO PURCHASERS OF RESALABLE ITEMS

BACKGROUND

An e-commerce company may provide an online marketplace that makes products and inventory from multiple, third-party merchants available for purchase by consumers through a consolidated shopping website. The online marketplace may provide consumers with the convenience of shopping for a variety of different types, makes, and models of products from a single product catalog through a familiar user interface. In addition to making the new inventory of third-party merchants available for sale, the online marketplace may further provide merchants and consumers the opportunity to resell their used items through the same shopping experience and user interface. The listings for used items may be presented to consumers side-by-side with item descriptions, technical specifications, customer reviews, ratings, pricing, and other information of the new item available from the product catalog.

Offering resale opportunities may provide additional revenues to the e-commerce company implementing the online marketplace. The e-commerce company may strive to inform value-conscious users of the resale opportunities that exist and encourage consumers to return to the online marketplace to resell their used items, purchased through the online marketplace or elsewhere, in order to increase the revenues generated from resale. In addition, with an increasing awareness of the importance of reducing pointless waste, consumer habits may be progressing from disposable purchases to a more conservation/recycle-minded approach.

It is with respect to these and other considerations that the disclosure made herein is presented.

DETAILED DESCRIPTION

Figure 1:
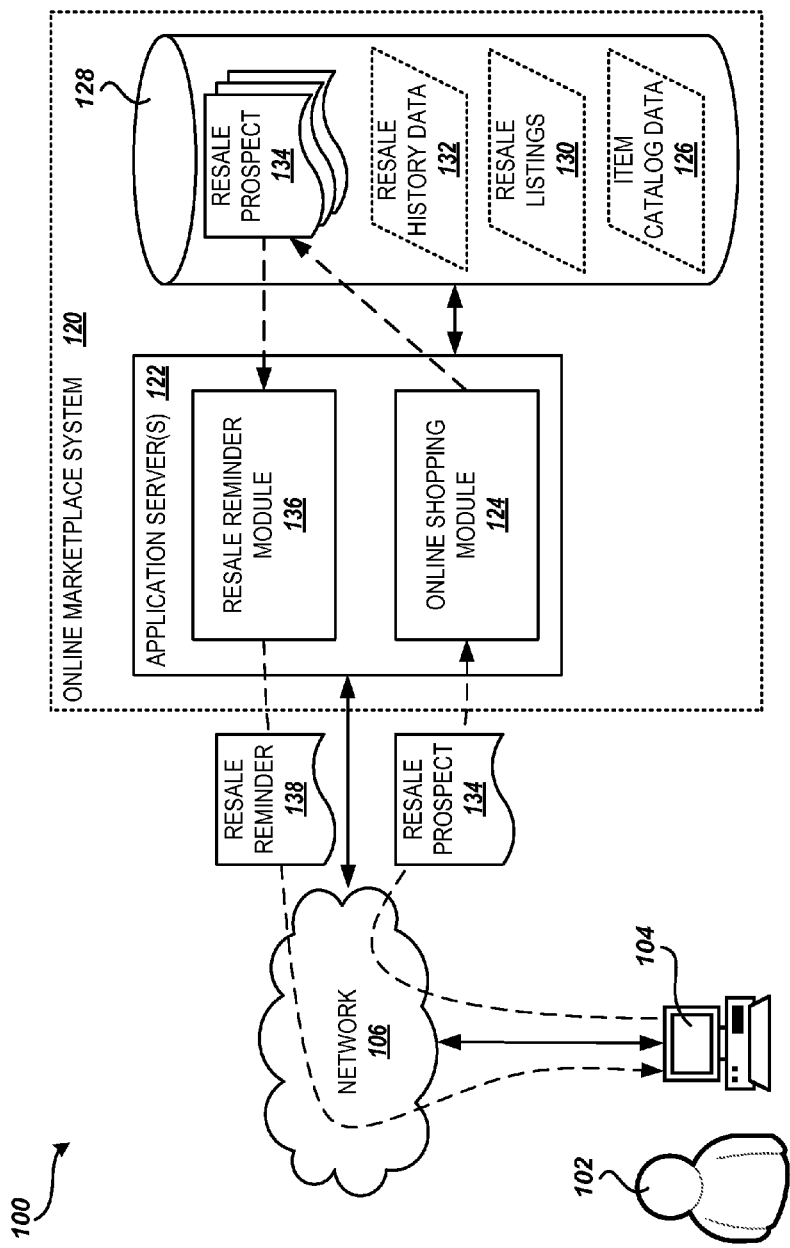
FIG. 1 is a system diagram showing aspects of an illustrative operating environment for presenting resale opportunities to purchasers of resalable items, including several software and hardware components provided by embodiments presented herein.

The following detailed description is directed to technologies for presenting resale opportunities to purchasers of resalable items. Utilizing the technologies described herein, an online marketplace system tracks the purchase of reusable/resalable items, such as books, video games, CDs, used clothing, jewelry, electronics, and the like, and presents the purchaser with a number of resale options for the item at some point in the future. The purchaser may further be asked whether they intend to resell the item at a future time, how long they expect to use the item, and/or when they expect to resell it. This information is stored in the online marketplace system and periodically analyzed in order to send resale reminders to the purchaser when the date for resale of the item is near or when an optimal time and/or price for resale of the item is indicated. The reminders may further contain a facility that allows the purchaser to quickly and easily create a resale listing for the item in the online marketplace system. Presenting multiple resale opportunities to the purchaser at various points in time may encourage purchasers to resell their used items through the online marketplace system, increasing revenue from fees charged for the resale as well as increasing the availability of used items in the online marketplace to other consumers.

According to embodiments, an identifier of a resalable item is received. The identifier may be received during the time of purchase of the item by the purchaser, for example. A number of resale estimates are determined for the item, each resale estimate comprising an estimated value to the purchaser if the item is resold through a corresponding option for reselling the item. The resale estimates are presented to the purchaser, and the purchaser indicates whether or not he or she intends to resale the item at a future date. Upon receiving an indication that the purchaser intends to resale the item, a resale prospect is stored containing the identifier of the item, an identifier of the purchaser, the date for resale of the item, the resale estimates, and the like. The purchaser may then be presented with at least one reminder regarding the resale of the item on or near the date for resale. The reminder may further include the resale estimates and a facility allowing the purchaser to quickly and easily initiate resale of the item.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several software components for implementing the methods for presenting resale opportunities to consumers or purchasers of resalable items, according to embodiments provided herein. The environment 100 includes a consumer 102 that uses a consumer computer 104 to access an online marketplace system 120 across a network 106. According to embodiments, the online marketplace system 120 implements an online marketplace that makes a variety of both new and used items from multiple, third-party merchants available for purchase by consumers 102, as well as providing the consumers with the ability to sell their own products through the marketplace.

The consumer 102 may be an individual or entity that desires to purchase and/or sell one or more items through the online marketplace system 120. The consumer computer 104 may be a personal computer ("PC"), a desktop workstation, a laptop, a notebook, a personal digital assistant ("PDA"), an electronic-book reader, a game console, a set-top box, a consumer electronics device, a server computer, or any other computing device capable of connecting to the network 106 and communicating with the online marketplace system 120. The network 106 may be a local-area network ("LAN"), a wide-area network ("WAN"), the Internet, or any other networking topology known in the art that connects the consumer computer 104 to the online marketplace system 120. The online marketplace system 120 may include a number of application servers 122 that provide various online shopping and merchant services to the consumer computer 104 over the network 106. The application servers 122 may represent standard server computers, database servers, web servers, network appliances, desktop computers, other computing devices, and any combination thereof.

The consumer 102 may use a client application executing on the consumer computer 104 to access and utilize the online shopping services provided by the application servers 122. According to one embodiment, the client application may be a web browser application, such as the MOZILLA® FIREFOX® web browser from Mozilla Foundation of Mountain View, Calif. The web browser application exchanges data with the application servers 122 in the online marketplace system 120 using the hypertext transfer protocol ("HTTP") over the network 106. Alternatively, the client application may utilize any number of communication methods known in the art to communicate with the online marketplace system 120 and/or the application servers 122 across the network 106, including remote procedure calls, SOAP-based web services, remote file access, proprietary client-server architectures, and the like.

The application servers 122 may execute a number of modules in order to provide the online marketplace services. The modules may execute on a single application server 122 or in parallel across multiple application servers in the online marketplace system 120. In addition, each module may consist of a number of subcomponents executing on different application servers 122 or other computing devices in the online marketplace system 120. The modules may be implemented as software, hardware, or any combination of the two.

An online shopping module 124 may execute on the application servers 122. The online shopping module 124 may retrieve information regarding items offered for sale by the merchants in the online marketplace from item catalog data 126, and present the item information to the consumer 102 on the consumer computer 104. The item catalog data 126 may be stored in a datastore 128, such as a database, a file system, or any combination of these and other storage mechanisms available to the application servers 122 in the online marketplace system 120. The item catalog data 126 may contain information regarding the items offered for sale by merchants or other consumers 102 in the online marketplace. The item catalog data 126 may further contain information utilized to organize the items and facilitate searching, browsing, and purchasing of the items by the consumer 102. The online shopping module 124 may also provide other shopping services to the consumer 102 over the network 106, such as an online shopping cart, payment services, order tracking, order history, item returns, trade-in of items, and the like.

According to embodiments, the online shopping module 124 further provides services that allow consumers 102, also referred to herein as "purchasers," to resell used items purchased through the online marketplace or from other online or retail vendors. The online shopping module 124 may accept resale listings 130 from consumers 102 and store the listings in the datastore 128. The resale listings 130 may be presented to the consumers 102 in conjunction with the item information for the associated item from the item catalog data 126, such as descriptions, technical specifications, customer reviews, ratings, pricing, and other information regarding the item.

The online shopping module 124 may further facilitate purchase of the used item from the resale listings 130 by other consumers 102, and the history of resold used items may be tracked in resale history data 132. The resale history data 132 may contain information including the item sold, the type of the sold item, an identification of the consumer 102 selling the item, the date the item was originally purchased, the condition of the item when sold, the price for which the item was sold, and the like. The resale history data 132 may be used to determine characteristics, trends, and statistics regarding resale activity in the online marketplace system 120, including the average selling price of a particular used item based on age and/or condition, the types of items most frequently resold, the reselling behavior of a particular customer, the types and characteristics of customers most likely to resell items or particular types of items, the average age of resell of a particular item or type of item, and the like. In addition, the resale history data 132 may include characteristics, trends, and statistics regarding resale activity for items through external websites, marketplaces, and other resale channels.

According to further embodiments, the online shopping module 124 and/or other modules executing in the online marketplace system 120 may collect resale prospects 134 and store them in the datastore 128. Each resale prospect 134 may represent an opportunity for a particular consumer 102 to resell a particular item. The collected resale prospects 134 and the characteristics, trends, and statistics determined from the resale history data 132 may be utilized to drive consumers 102 to resell their used items through the online marketplace system 120, to suggest to the consumers when to resell their items in order to get the best value, and to otherwise facilitate efficient and easy resale of used items for consumers, as will be described below in the embodiments presented herein.

Figure 2:
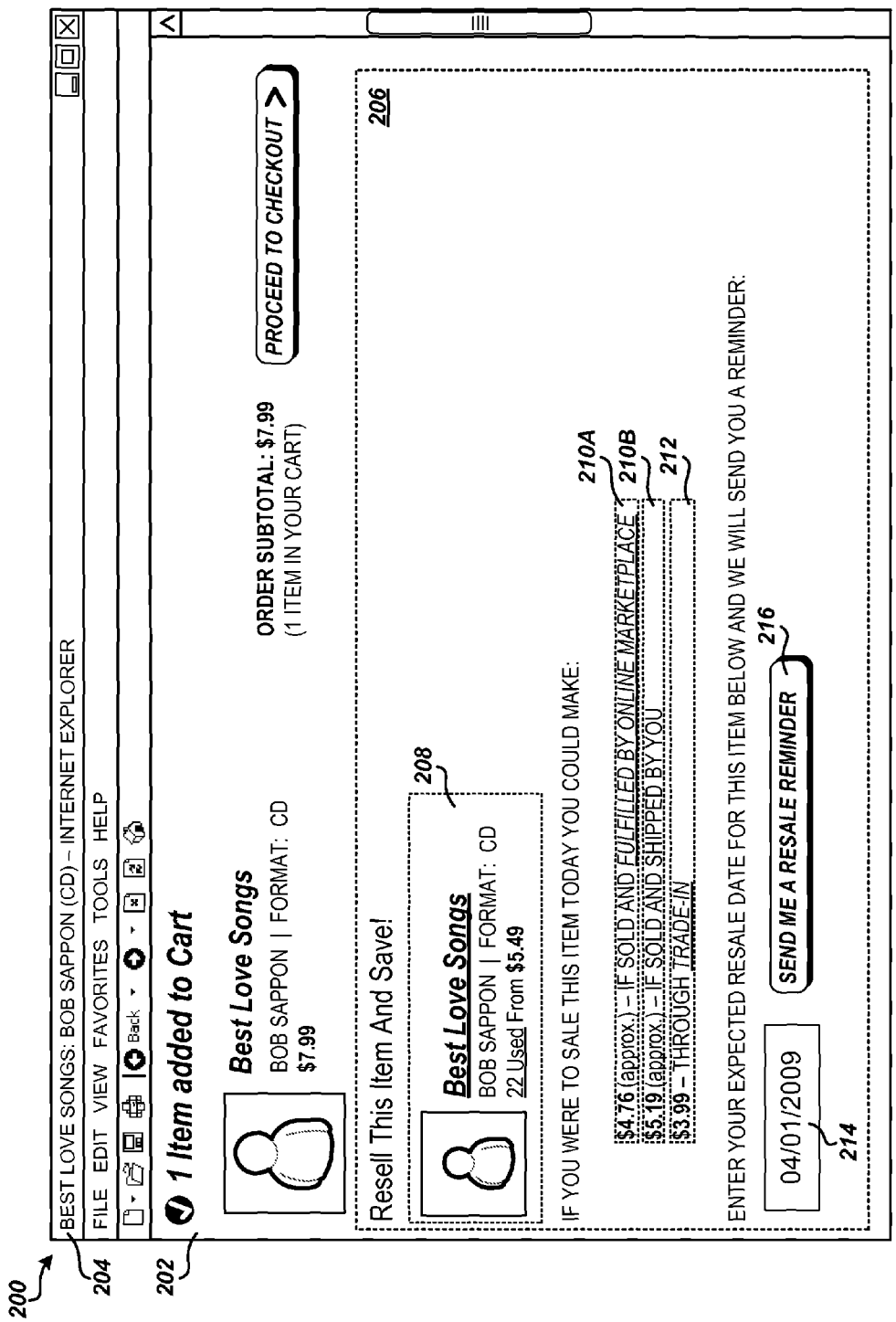
FIG. 2 is a screen diagram showing an exemplary user interface for presenting resale options to a consumer, according to embodiments presented herein.

In one embodiment, the online shopping module 124 may collect resale prospects 134 during purchase of items through the online marketplace system 120. For example, the online shopping module 124 may prompt the consumer 102 as to his/her intention to resell the item when the item is placed into a virtual "shopping cart" for purchase, upon payment for the item(s) contained in the shopping cart, during confirmation of the purchase of the item, and the like. FIG. 2 shows an illustrative user interface ("UI") 200 presented to a consumer 102 at a consumer computer 104, according to one embodiment. The UI 200 may be displayed on the consumer computer 104 when the consumer 102 places the item in the virtual shopping cart, for example. The UI 200 may be sent by the online shopping module 124 as a webpage 202 to be rendered in a window 204 of the client application executing on the consumer computer 104, as described above in regard to FIG. 1.

The UI 200 may include information regarding the selected item from the item catalog data 126 along with an opportunity to purchase the item. According to embodiments, the UI 200 further includes resale information 206 presented to the consumer 102 illustrating the resale opportunities that may exist for the selected item. The online shopping module 124 may determine whether to present the resale information 206 to the consumer 102 based on the resale potential of the item, the frequency that the item or items of the same type are resold, the reselling behavior of the consumer, and/or any combination of these as established from the characteristics, trends, and statistics determined from the resale history data 132, from lists of items or item types for resale in the online marketplace system 120, and the like.

The resale information 206 may include an item digest/link 208 of the resale listing(s) 130 for the item currently in the online marketplace system 120, allowing the consumer 102 to view how the item is listed for resale as well as the price(s) asked for the currently pending resale listings. In addition, the resale information 206 may provide one or more resale estimates 210A-210B (referred to herein generally as resale estimate 210 or resale estimates 210) indicating an estimated value to the consumer 102 for the various options for resale of the item that may be available through the online marketplace. For example, the online marketplace system 120 may offer multiple means of reselling a used item, such as a service where the used item is sent to the online marketplace and the online marketplace system 120 facilitates listing, sale, and shipment of the used item to the purchaser, a service where the used item is listed and sold by the online marketplace system, but the consumer 102 handles the shipment to the purchaser, and the like. Each of these options may represent a different estimated value to the consumer 102 upon sale of the item, depending on both the price that the item is likely to sell for as well as the fees and costs associated with the selected option for reselling the used item.

The resale estimates 210 may be calculated based on what used items that are the same as or similar to the selected item are currently selling for, as determined from the resale history data 132, or the resale estimates may be calculated from what the used item is expected to sell for in the future based on the average age upon resale for items of that type and the characteristics, trends, and statistics determined from the resale history data 132. It will be appreciated that the resale estimates 210 may include an estimated value to the consumer 102 upon resale of the used item, an estimated range of values, an expected purchase price for the item, a listing of the expected fees, and/or any combination of these and other relevant estimates. The resale information 206 may also include the value to the consumer 102 for other options for disposing of the item, such as that shown at 212 in FIG. 2 for trading-in the used item when the consumer 102 is finished with the item or resale opportunities for the item through other marketplaces or resale channels not provided by the online marketplace. The value for other options for disposing of the item may be presented to allow the consumer to compare and fully evaluate his/her options for reselling the used item through the online marketplace system 120.

According to further embodiments, the resale information 206 also includes a facility for the consumer 102 to express his/her interest in reselling the selected item, based on the options presented in the resale information. For example, the resale information 206 may include a date field 214 allowing the consumer 102 to specify the expected date for resale of the item, as well as a UI pushbutton control 216 allowing the consumer to specify that they wish to be reminded or otherwise prompted to resell the item at or near the specified expected date for resale. Upon the consumer 102 selecting UI pushbutton control 216, the online shopping module 124 may generate the resale prospect 134 for the item and the specified expected date for resale, and store the resale prospect in the datastore 128, as described below. Additionally or alternatively, the consumer may be able to specify other criteria for triggering the resale of the item, such as a target reselling price for the item that must be hit before the item is to be resold.

It will be appreciated that the UI 200 may contain additional or alternative information and/or UI controls beyond that described herein and shown in the figures, in order to prompt the consumer 102 as to his/her intention to resell the selected item. For example, additionally or alternatively, the resale information 206 may include an optimal time/date and expected resale price for the item based on analysis of the resale history data 132, such as "You can get 60% of your purchase price back if you resell this item in the online marketplace in 25 days." In a further embodiment, the resale information 206 shown in FIG. 2 or similar information may be presented to the consumer 102 in conjunction with item information from the item catalog data 126 regarding a particular item being evaluated for purchase. The resale information 206 may be shown for all items or for a subset of items or item types that are likely to be resold, based on the resale history data 132. Showing the resale information 206, including the resale estimates 210, to the consumer 102 in conjunction with item information from the item catalog data 126 may influence the consumer to purchase the item through the online marketplace system 120.

In another embodiment, the online shopping module 124 may generate a resale prospect 134 automatically upon the purchase of a particular item or item type through the online marketplace system 120, based on the resale potential of the item, the frequency that the item or items of the same type are resold, the reselling behavior of the purchasing consumer 102 or other consumers similar to the purchasing consumer, and/or any combination of these as established from the characteristics, trends, and statistics determined from the resale history data 132 and the like. In further embodiments, the resale prospects 134 may be collected from other sources in addition to or as an alternative to being generated by the online shopping module 124. For example, consumers 102 may upload a list of items that were purchased through the online marketplace or from other online or retail sources to the online marketplace system 120, from which one or more resale prospects 134 may be generated and added to the datastore 128.

In another example, an add-in or plug-in for a Web browser application may be installed by the consumer 102 that monitors purchases made online by the consumer and uploads the information regarding each purchased item to the online marketplace system 120, allowing a resale prospect 134 to be created and stored for the item in the datastore 128. In a further example, a consumer 102 may execute an application on a mobile phone or other wireless computing device that takes a picture of a bar code or other identifier(s) of an item using an onboard camera and presents resale information 206, including the resale estimates 210, regarding the item to the consumer, further allowing the consumer to specify his/her desire to resell the item now or at a future date, for which a resale prospect 134 may be created and stored for the item in the datastore 128. It will be appreciated that other sources for the collection of resale prospects 134 may be imagined by one skilled in the art in addition to or as an alternative to those described herein.

Figure 3:
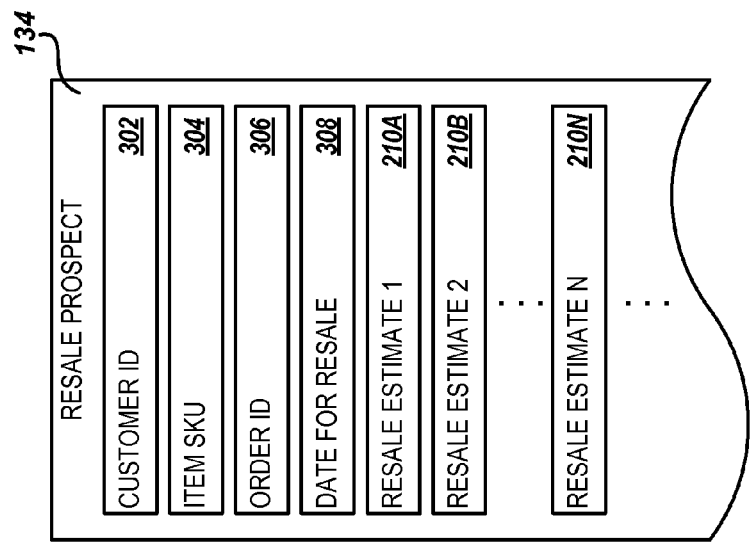
FIG. 3 is a data structure diagram illustrating a number of data elements maintained for a resale prospect, according to embodiments presented herein.

FIG. 3 is a data structure diagram showing a number of data elements stored in a data structure. It will be appreciated by one skilled in the art that the data structure shown in the figure may represent a data file, a database table, an object stored in a computer memory, a programmatic structure, or any other data container commonly known in the art. Each data element included in the data structure may represent one or more fields in a data file, one or more columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 3 shows one example of data elements that may be stored for each resale prospect 134 in the datastore 128. As described above, each resale prospect 134 may represent an opportunity for a particular consumer 102 to resell a particular item through the online marketplace. For example, the resale prospect 134 may include a customer ID 302 identifying the consumer 102 reselling the item. According to one embodiment, the consumer 102 may be a registered customer of the online marketplace, and the customer ID 302 of the consumer from the online marketplace system 120 may be utilized to identify the consumer in the resale prospect 134. The resale prospect 134 may further include an identifier of the item to be resold, such as an item stock-keeping unit ("SKU") 304, as shown in FIG. 3.

The resale prospect 134 may also include an order ID 306, indicating the original order within the online marketplace system 120 in which the item identified by the item SKU 304 was purchased. Alternatively or additionally, the resale prospect 134 may include a date of purchase of the item, the purchase prices for the item, and an indicator of the source of the original item. The resale prospect 134 may include a date for resale 308 indicating an expected date that the consumer identified by the customer ID 302 wishes to resell the item identified by the item SKU 304. The date for resale 308 may be specified by the consumer 102 when the resale prospect 134 is created, such as through the UI 200 described above in regard to FIG. 2. Alternatively, the date for resale 308 may be calculated by the online marketplace system 120 based on the purchase date of the item and the average age of the same or similar items upon resale, the reselling behavior of the consumer 102 or similar consumers, and the like as determined from the resale history data 132.

According to another embodiment, the resale prospect 134 includes a number of resale estimates 210A-210N corresponding to the various options for resale of the item available through the online marketplace, as described above in regard to FIG. 2. For example, the resale prospect 134 may include a resale estimate 1 210A indicating the value to the consumer 102 if the consumer sends the item to the online marketplace and the online marketplace system 120 facilitates listing, sale, and shipment of the used item to the purchaser. Similarly, the resale prospect 134 may include a resale estimate 2 210B indicating the value to the consumer 102 if the used item is listed and sold by the online marketplace system, but the consumer handles the shipment to the purchaser. It will be appreciated that the resale prospect 134 may include any number of resale estimates 210, depending on the number of options available to resell the used item through the online marketplace.

In one embodiment, each resale estimate 210 may be calculated based on the estimated selling price of the item on the date for resale 308 and any fees and costs associated with the selected option for reselling the used item. In another embodiment, the resale estimate 210 may be calculated based on the estimated selling price of the item on the current date. The estimated selling price for the item on the date for resale 308 and/or the current date may be calculated based on the current average selling price of the same or similar items, the trend in the selling price of the items, the age of the item, the age the item will be at the date for resale 308, and the like, as determined from the resale history data 132. Each resale estimate 210 may comprise a single estimated value, an estimated range of values, an enumeration of expected selling price and fees, and/or any combination of these and other relevant estimates. In a further embodiment, a variance of resale prices may be determined from the resale history data 132 based on predicative modeling within a predetermined confidence interval and utilized to calculate the estimated selling price component of the resale estimates 210.

According to one embodiment, the online marketplace system 120 periodically updates the resale estimates 210 in each resale prospect 134 based on changes in the resale history data 132 in order for up-to-date and accurate values to be available to the consumers 102, allowing consumers 102 to select the best time to resell their items. For example, the online marketplace system 120 may update the resale estimates 210 in the resale prospects 134 from the latest resale history data 132 on a daily basis. It will be appreciated that the resale estimates may be updated more or less frequently, such as hourly or weekly, as required by the online marketplace system 120. It will be further appreciated that the resale prospect 134 may contain additional data elements beyond those shown in FIG. 3 and described above that are utilized by the resale reminder module 136 and/or other modules of the online marketplace system 120.

Returning to FIG. 1, a resale reminder module 136 executes on the application servers 122, according to a further embodiment. The resale reminder module 136 may periodically scan the resale prospects 134 stored in the datastore 128 to determine if a resale reminder 138 should be generated and sent to the associated consumer 102. For example, the resale reminder module 136 may provide resale reminders 138 to the consumer 102 identified by the customer ID 302 of the resale prospect 134 at or near the date for resale 308. Alternatively or additionally, the resale reminder module 136 may analyze the trends and statistics in the resale history data 132 for items the same as or similar to the item associated with the resale prospect 134 by the item SKU 304 to determine an estimated optimum resale date and price for the item. The resale reminder module 136 may then generate and provide the resale reminder 138 to the associated consumer 102 at or near the optimum resale date in order for the consumer to obtain the best value for his/her used item. It will be appreciated that resale reminders 138 may be generated and provided to the consumer 102 based on other analysis of the item's lifecycle, market trends, and product usage rates determined from the resale history data 132, as described above.

Figure 4:
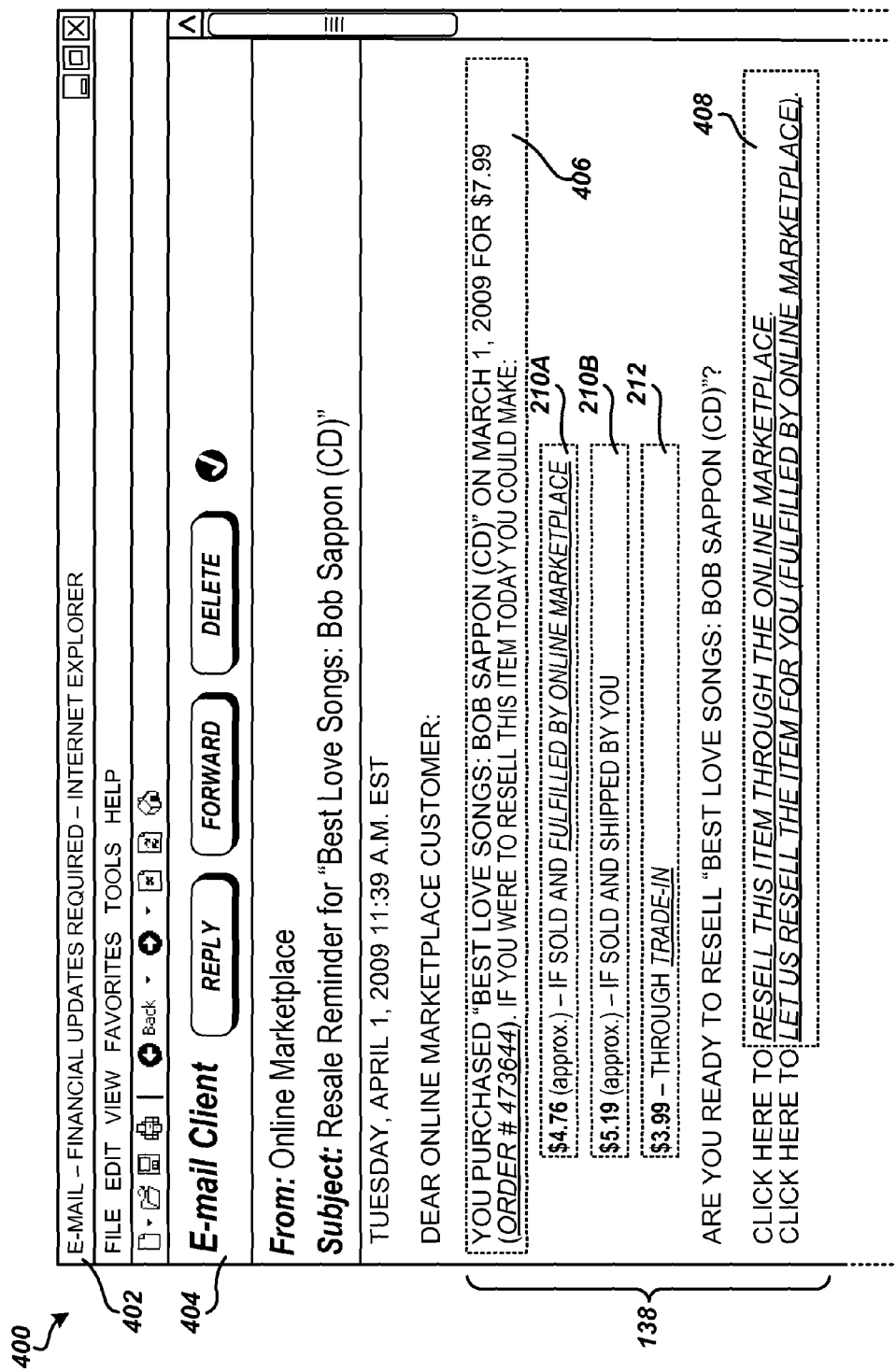
FIG. 4 is a screen diagram showing an exemplary user interface for presenting a resale reminder to a consumer, according to embodiments presented herein.

The resale reminder 138 may comprise information identifying the item associated with the resale prospect 134 by the item SKU, the original purchase date and price for the item, one or more resale estimates 210 corresponding to the various options for reselling the item through the online marketplace system 120, and a facility to allow the consumer 102 to easily convert the resale prospect 134 to a resale listing 130. For example, FIG. 4 shows an illustrative user interface ("UI") 400 presented at a consumer computer 104 for displaying the resale reminder 138 to a consumer 102, according to one embodiment. The UI 400 includes a window 402 of an email client application displaying an email message 404 from the online marketplace system 120 containing the resale reminder 138. The email message 404 containing resale reminder 138 may be generated by the resale reminder module 136 and transmitted to the consumer computer 104 of the consumer 102 identified by the customer ID 302 over the network 106, for example.

The resale reminder 138 may include original purchase information 406 for the item associated with the resale prospect 134, including a description of the item, the purchase date, the original purchase price, the order ID 306 from the resale prospect 134, and the like. In addition, the resale reminder 138 may include the one or more resale estimates 210A-210B from the resale prospect 134. A resale estimate 210 may be included for each of the various options for resale of the item available through the online marketplace system 120 and may relate the value to the consumer 102 for reselling the associated item on the date the resale reminder 138 was generated, on the date for resale 308 indicated in the resale prospect 134, at a future optimum date for resale determined by the resale reminder module 136 from the resale history data 132, and/or for other dates and resale opportunities. In addition, the value for other options for disposing of the item associated with the resale prospect 134, such as the trade-in value shown at 212, may be included in the resale reminder 138 to allow the consumer 102 to compare and fully evaluate his/her options for reselling the used item through the online marketplace system 120.

According to further embodiments, the resale reminder 138 also includes a facility for the consumer 102 to easily convert the resale prospect 134 to a resale listing 130. For example, the resale reminder 138 may contain a number of links 408 or other UI controls that allow the consumer 102 to initiate the resale of the used item through one of the options available through the online marketplace system 120. In one embodiment, the online shopping module 124, the resale reminder module 136, and/or other modules in the online marketplace system 120 may utilize the customer ID 302, the item SKU 304, the order ID 306, and other information from the resale prospect 134 to automatically generate a resale listing 130 in the datastore 128 for reselling of the used item. In other embodiments, the consumer 102 may be prompted for additional information required to list the used item for resale through the online marketplace system 120, may be sent shipping and/or packing materials to ship the item to the online marketplace or to the eventual purchaser, and the like.

In additional embodiments, the resale reminder 138 may provide facilities for other responses from the consumer 102 beyond converting the resale prospect to a resale listing. For example, the resale reminder 138 may include a facility allowing the consumer 102 to "snooze" the reminder for some period of time before another reminder is generated and sent. Similarly, the resale reminder 138 may provide a facility that allows the consumer 102 to specify that they no longer wish to be provided reminders regarding the item, as may be the case where a consumer has decided to keep the item instead of reselling it, for example.

It will be appreciated that the UI 400 may contain additional or alternative information and/or UI controls beyond that described herein and shown in the figures, in order to display the resale reminder 138 to the associated consumer 102. For example, the resale reminder module 136 and/or other modules in the online marketplace system 120 may provide the consumers 102 with a facility to add, browse, modify, and delete the resale prospects 134 associated with the consumer by the customer ID 302, allowing for a "wishlist" of items for resale to be maintained. The consumer 102 may further be able to view the same or similar information from the resale reminder 138 for each resale prospect 134 and convert the resale prospect to a resale listing through the same facility. Resale reminders 138 may also be made available to the consumer 102 through other channels beyond those described above, such as through a resale application executing on a mobile device, through text messages, through a resale client application or browser plug-in that presents pop-up messages to the consumer, and the like.

According to a further embodiment, the online shopping module 124, the resale reminder module 136, and/or other modules in the online marketplace system may provide other opportunities for consumers to view, manage, and convert their resale prospects 134. For example, a "Resale Item" pushbutton or other UI control may be displayed in conjunction with "Return Item" and/or "Rate Item" controls provided to the consumer 102 with each order in a list of the orders placed through the online marketplace system 120, allowing the consumer to resell one or more items from the corresponding order. It will be appreciated that the same or similar information included in the resale reminder 138 for a resale prospect 134 may be accessible by the consumer 102 through any number of UIs and/or facilities beyond those shown in the figures and described herein, and it is intended that this application include all such UIs and facilities for providing the resale reminder 138 to the consumer.

Figure 5:
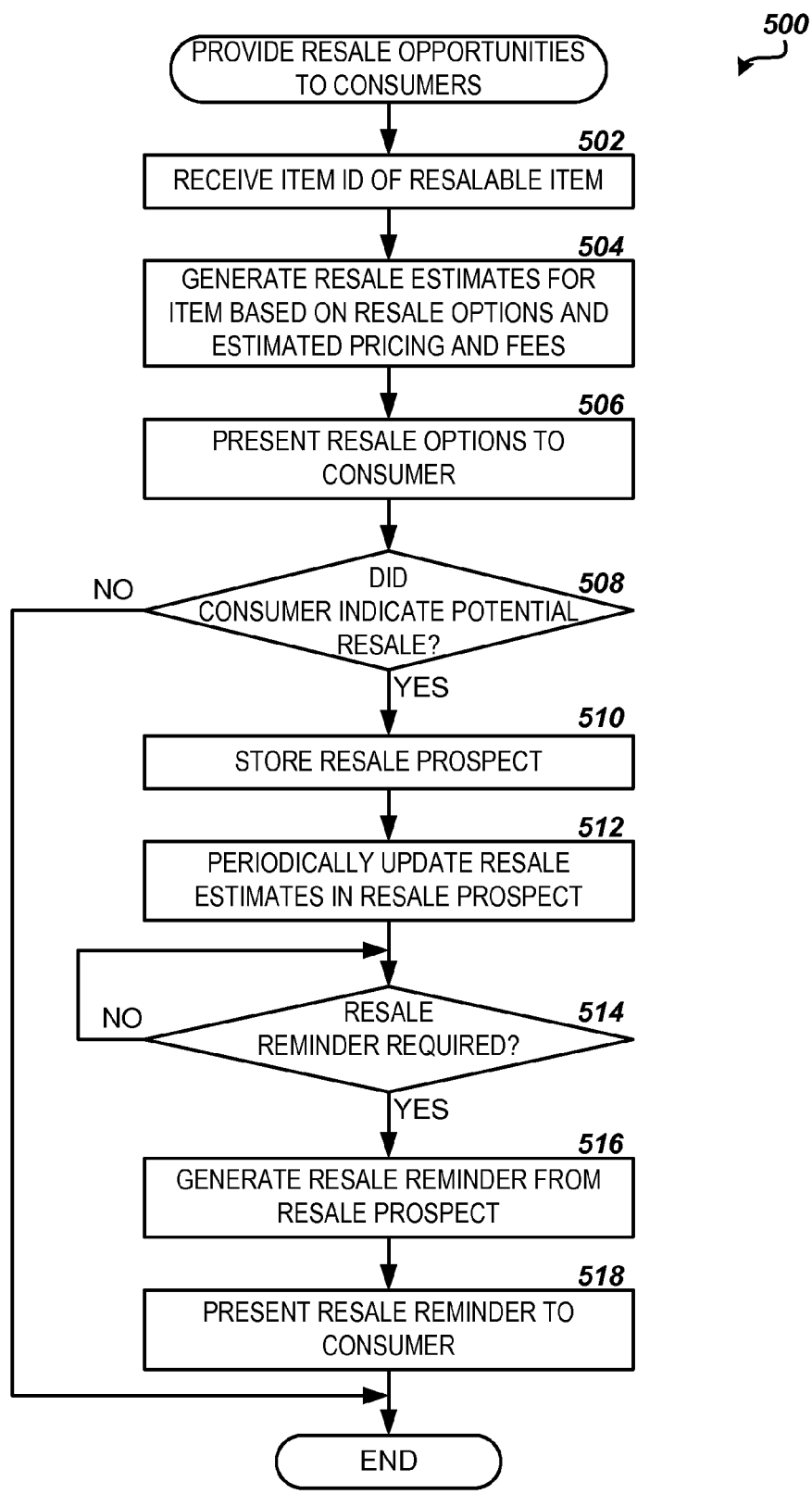
FIG. 5 is a flow diagram for one method of presenting resale opportunities to purchasers of resalable items, according to embodiments described herein.

Turning now to FIG. 5, additional details will be provided regarding the embodiments presented herein for presenting resale opportunities to purchasers of resalable items. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 illustrates a routine 500 for presenting resale opportunities to consumers 102, according to the embodiments described herein. The routine 500 may be performed by the online shopping module 124, the resale reminder module 136, and/or other modules or components executing on the application servers 122 in the online marketplace system 120, or by any other combination of modules and components. The routine 500 begins at operation 502, where the ID of a resalable item is received by the online shopping module 124 or other module in the online marketplace system 120. For example, the online shopping module 124 may receive the item SKU of an item being placed into a virtual shopping cart for purchase, upon payment for the item during the purchase process, during confirmation of the purchase of the item, and the like.

The online shopping module 124 may further determine the resalability of the item based on the frequency that the item or items of the same type are resold, the reselling behavior of the consumer, and/or any combination of these as established from the characteristics, trends, and statistics determined from the resale history data 132; from lists of items or item types for resale in the online marketplace system 120; and the like. Alternatively, the ID of the resalable item may be received directly from a consumer 102 wishing to resell the item through the online marketplace system 120. For example, consumers 102 may upload a list of items for resale that were purchased through the online marketplace or from other online or retail sources to the online marketplace system 120.

From operation 502, the routine 500 proceeds to operation 504, where the online shopping module 124 generates a number of resale estimates 210 for the item corresponding to the various options for resale of the item available through the online marketplace system 120, as described above in regard to FIGS. 2 and 3. Each resale estimate 210 may be calculated based on the estimated selling price of the item on the current date or the predicted date for resale of the item, along with any fees and costs associated with the option for reselling the used item. The estimated selling price for the item may be calculated based on the current retail price of the item, the current average reselling price of the same or similar items, the trend in the reselling price of the items, the age the item will be at the predicted date of resale, and like, as determined from the resale history data 132. Each resale estimate 210 may comprise a single estimated value, an estimated range of values, an enumeration of expected selling price and fees, and/or any combination of these and other relevant estimates. In a further embodiment, a variance of resale prices may be determined from the resale history data 132 based on predicative modeling within a predetermined confidence interval and utilized to calculate the estimated selling price component of the resale estimates 210.

The routine 500 proceeds from operation 504 to operation 506, where the online shopping module 124 presents the resale estimates 210 corresponding to the various resale options to the consumer 102. For example, the online shopping module 124 may present a UI 200 to the consumer 102 containing resale information 206 as described above in regard to FIG. 2. The resale information 206 may include the resale estimates 210 generated at operation 504, other options for disposing of the item, such as that shown at 212 in FIG. 2 for trading-in the used item, as well as a facility for the consumer 102 to express his/her interest in reselling the item at a future date, based on the resale options presented in the resale information.

From operation 506, the routine 500 proceeds to operation 508, where the online shopping module 124 determines whether the consumer 102 expressed interest in reselling the item through the online marketplace system 120. For example, the UI 200 shown to the consumer 102 may include a include a date field 214 allowing the consumer to specify the expected date for resale of the item, as well as a UI pushbutton control 216 allowing the consumer to specify that he/she wishes to be reminded or otherwise prompted to resell the item at or near the specified expected date for resale. In another embodiment, an interest in reselling the item may be inferred from the method of receiving the ID of the item to resell, such as when a consumer 102 uploads a list of items from resell to the online marketplace system 120.

If the consumer 102 expresses an interest in reselling the item through the online marketplace system 120, the routine 500 proceeds from operation 508 to operation 510, where the online shopping module 124 or other modules in the online marketplace system creates a resale prospect 134 associated with the consumer and the item and stores the resale prospect in the datastore 128. In one embodiment, the resale prospect 134 includes the customer ID 302 of the consumer 102, the item SKU 304 of the item, the order ID 306 of the order for the item being processed by the online shopping module 124, and the date for resale 308 specified by the consumer through the UI 200. In other embodiments, the resale prospect 134 may include an indication of the original source, purchase price, and purchase date of the item based on information supplied by the consumer 102. In addition, the date for resale 308 for the resale prospect 134 may be determined by the online shopping module 124, the resale reminder module 136, or other modules of the online marketplace system 120 based on the purchase date of the item, the average age of the same or similar items upon resale, the reselling behavior of the consumer 102 or similar consumers, and the like as determined from the resale history data 132.

If, at operation 508, the consumer 102 does not express an interest in reselling the item through the online marketplace system 120, the online shopping module 124 may, nonetheless, make a record of the resale opportunity for the item, by either storing a resale prospect 134 associated with the consumer and the item or by storing some other record of the resale opportunity in the datastore 128. In this case, the resale prospect 134 may include a flag that indicates that no reminders are to be generated, but the consumer 102 may be provided other, alternative opportunities to review and manage the resale prospect. For example, after successfully using the resale services of the online marketplace system 120, a consumer 102 may request that the system "re-activate" resale prospects 134 regarding items for which the consumer originally did not express an interest in reselling.

The routine 500 proceeds from operation 510 to operation 512, where the resale reminder module 136 or other modules in the online marketplace system 120 periodically update the resale estimates 210 included in the resale prospect 134. As described above in regard to FIG. 3, the online marketplace system 120 may periodically update the resale estimates 210 in each resale prospect 134 based on changes in the resale history data 132 in order for up-to-date and accurate values to be available to the consumers 102, allowing consumers 102 to select the best time to resell their items. For example, the online marketplace system 120 may update the resale estimates 210 in the resale prospects 134 from the latest resale history data 132 on a daily basis.

From operation 512, the routine 500 proceeds to operation 514, where the resale reminder module 136 determines whether a resale reminder 138 needs to be generated for the resale prospect 134. As described above in regard to FIG. 1, the resale reminder module 136 may periodically scan the resale prospects 134 stored in the datastore 128 to determine if a resale reminder 138 should be generated and sent to the associated consumer 102. For example, the resale reminder module 136 may send resale reminders 138 to consumer 102 identified by the customer ID 302 of the resale prospect 134 at or near the date for resale 308. Alternatively or additionally, the resale reminder module 136 may analyze the trends and statistics in the resale history data 132 for items the same as or similar to the item associated with the resale prospect 134 by the item SKU 304 to determine an estimated optimum resale date and price for the item. The resale reminder module 136 may then generate and send a resale reminder 138 to the associated consumer 102 at or near the optimum resale date in order for the consumer to obtain the best value for his/her used item.

If, at operation 514, the resale reminder module 136 determines that a resale reminder 138 is to be generated, the routine 500 proceeds to operation 516, where the resale reminder module 136 generates a resale reminder 138 from the resale prospect 134 associated with the consumer and the item. As described above in regard to FIG. 1, the resale reminder 138 may comprise information identifying the item associated with the resale prospect 134 by the item SKU, the original purchase date and price for the item, the resale estimates 210 from the resale prospect corresponding to the various options for reselling the item through the online marketplace system 120, and a facility to allow the consumer 102 to easily convert the resale prospect 134 to a resale listing 130.

The routine 500 then proceeds from operation 516 to operation 518, where the resale reminder module 136 presents the resale reminder 138 to the consumer 102. For example, as described above in regard to FIG. 4, the resale reminder module 136 may send an email message 404 to the consumer 102 associated with the resale prospect 134 containing the resale reminder 138. It will be appreciated that other methods known in the art may be utilized by the resale reminder module 136 to provide the resale reminder 138 to the consumer 102, including through a webpage or other UI accessible by the consumer through the online marketplace system 120. From operation 518, the routine 500 ends.

Figure 6:
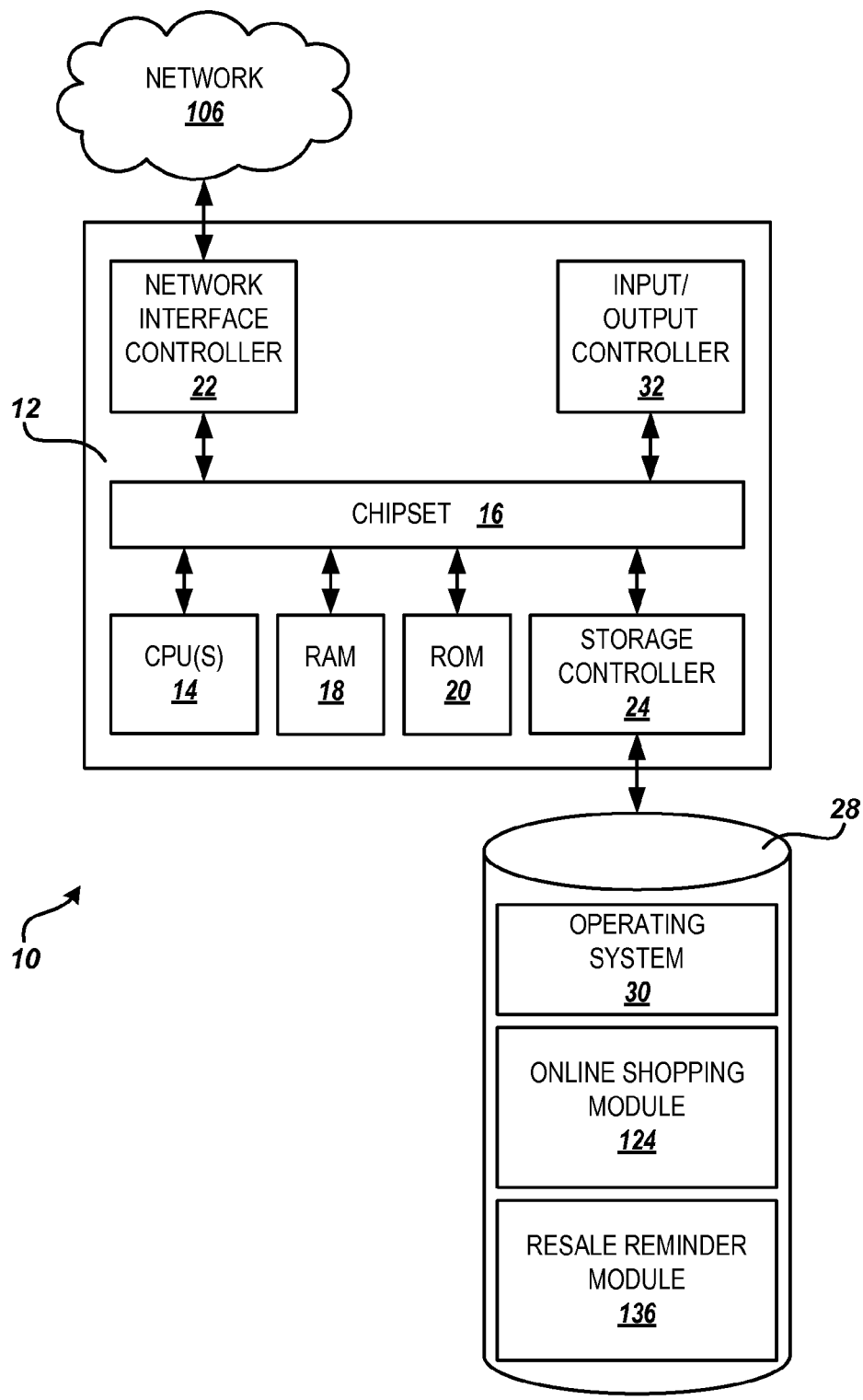
FIG. 6 is a computer architecture diagram showing an illustrative computer hardware architecture for computing devices described in embodiments presented herein.

FIG. 6 shows an example computer architecture 10 for a computer 12 capable of executing the software components described herein for presenting resale opportunities to purchasers of resalable items, in the manner presented above. The computer architecture 10 shown in FIG. 6 illustrates a conventional server computer, workstation, desktop computer, laptop, PDA, electronic book reader, digital wireless phone, network appliance, set-top box, or other computing device, and may be utilized to execute any aspects of the software components presented herein described as executing on the application servers 122, the consumer computer 104, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through a network, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices, such as other application servers 122, the consumer computer 104, a data storage system in the online marketplace system 120, and like, over the network 106 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the online shopping module 124 or the resale reminder module 136 described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 500 for presenting resale opportunities to purchasers of resalable items, as described above in regard to FIG. 5.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 6, may include other components that are not explicitly shown in FIG. 6, or may utilize an architecture completely different than that shown in FIG. 6.

Based on the foregoing, it should be appreciated that technologies for presenting resale opportunities to purchasers of resalable items are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:
   receive an identifier of an item which is resalable and is purchased by a purchaser;
   determine a date for resale for the item, wherein the date for resale is determined based upon a purchase date of the item and an average age of the same or similar items upon resale;
   determine one or more resale estimates for the item, each of the one or more resale estimates comprising an estimated value to the purchaser upon reselling the item on the date for resale;
   present the one or more resale estimates to the purchaser;
   receive an indication from the purchaser of an intent to resale the item;
   upon receiving the indication of the intent to resale the item, store a resale prospect comprising the identifier of the item, an identifier of the purchaser, the date for resale of the item, and the one or more resale estimates; and
   present a resale reminder to the purchaser on or near the date for resale of the item, the resale reminder comprising the one or more resale estimates for the item and a facility allowing the purchaser to initiate resale of the item.

2. The non-transitory computer-readable medium of claim 1, wherein the identifier of the item is received during the purchase of the item by the purchaser.

3. The non-transitory computer-readable medium of claim 1, wherein the date for resale of the item is received from the purchaser.

4. The non-transitory computer-readable medium of claim 1, wherein each of the one or more resale estimates corresponds to the estimated value to the purchaser upon reselling the item through one of a plurality of options for reselling the item.

5. The non-transitory computer-readable medium of claim 1, having further computer-executable instructions stored thereon that cause the computer to periodically update the one or more resale estimates in the resale prospect based on resale history data.

6. A computer-implemented method of presenting resale opportunities to a purchaser of an item which is resalable, the method comprising executing instructions in a computer system to perform the operations of:
   receiving an identifier of the item;
   determining a date for resale for the item, wherein the date for resale is determined based upon a purchase date of the item and an average age of the same or similar items upon resale;
   determining, using a computer processor, a resale estimate for the item corresponding to an option for reselling the item, the resale estimate comprising an estimated value to the purchaser upon reselling the item on the date for resale;
   presenting the resale estimate for the item to the purchaser;
   receiving an indication from the purchaser of an intent to resale the item at a future date;

upon receiving the indication of the intent to resale the item, store a resale prospect comprising the identifier of the item, an identifier of the purchaser, the date for resale of the item, and the resale estimate; and presenting a resale reminder to the purchaser on or near the date for resale of the item, the resale reminder comprising the resale estimate for the item and a facility allowing the purchaser to initiate resale of the item.

7. The computer-implemented method of claim 6, wherein the identifier of the item is received during the purchase of the item by the purchaser.

8. The computer-implemented method of claim 6, wherein the resale estimate comprises an estimated value to the purchaser upon reselling the item through the corresponding option for reselling the item.

9. The computer-implemented method of claim 6, wherein the date for resale of the item is received from the purchaser in conjunction with the indication of the intent to resale the item.

10. The computer-implemented method of claim 6, wherein presenting the resale reminder to the purchaser comprises sending an email message containing the resale reminder to the purchaser.

11. The computer-implemented method of claim 6, further comprising periodically updating the resale estimate in the resale prospect based on resale history data.

12. A system for presenting resale opportunities to a purchaser of a resalable item, the system comprising:

an online marketplace system comprising one or more application servers;

an online shopping module executing on the one or more application servers and configured to receive an identifier of the item during purchase of the item by the purchaser, determine a date for resale for the item, wherein the date for resale is determined based upon a purchase date of the item and an average age of the same or similar items upon resale;

determine one or more resale estimates for the item, each of the one or more resale estimates corresponding to an option for reselling the item on the date for resale;

present the one or more resale estimates to the purchaser;

receive an indication from the purchaser of an intent to resale the item;

upon receiving the indication of the intent to resale the item, store a resale prospect comprising the identifier of the item, an identifier of the purchaser, the date for resale of the item, and the one or more resale estimates; and a resale reminder module executing on the one or more application servers and configured to present a resale reminder to the purchaser on or near the date for resale of the item, the resale reminder comprising the one or more resale estimates for the item and a facility allowing the purchaser to initiate resale the item.

13. The system of claim 12, wherein the date for resale of the item is received from the purchaser.

14. The system of claim 12, wherein presenting the resale reminder to the purchaser comprises sending an email message containing the resale reminder to the purchaser.

* * * * *